United States Patent [19]

Corpora et al.

[11] Patent Number: 5,517,539

[45] Date of Patent: May 14, 1996

[54] METHOD OF DECONTAMINATING A PWR PRIMARY LOOP

[75] Inventors: Gary J. Corpora, Monroeville; Phillip E. Miller, Greensburg; Thomas G. Bengel, Plum Borough; David R. Peffer, Greensburg, all of Pa.

[73] Assignee: Westinghouse Electric Corporation, Pittsburgh, Pa.

[21] Appl. No.: 356,820

[22] Filed: Dec. 15, 1994

[51] Int. Cl.$^6$ ................................................ G21C 19/42
[52] U.S. Cl. .................... 376/310; 376/299; 376/305; 376/306
[58] Field of Search ................................. 376/310, 299, 376/282, 211, 339, 305, 306; 252/635, 634; 976/DIG. 130

[56] References Cited

U.S. PATENT DOCUMENTS

| | | |
|---|---|---|
| 3,734,823 | 5/1973 | Brown et al. ............................ 376/217 |
| 4,021,301 | 5/1977 | Frei ......................................... 376/328 |
| 4,204,911 | 5/1980 | Cooper .................................... 376/314 |
| 4,647,425 | 3/1987 | Battaglia et al. ........................ 376/308 |
| 4,699,755 | 10/1987 | Dagard et al. ........................... 376/313 |
| 5,108,697 | 4/1992 | Esposito et al. ......................... 376/306 |
| 5,268,943 | 12/1993 | Corletti et al. ............................ 376/282 |
| 5,278,743 | 1/1994 | Bengel et al. ............................ 376/310 |
| 5,325,410 | 6/1994 | Corpora et al. ........................... 376/313 |

Primary Examiner—Donald P. Walsh
Assistant Examiner—Meena Chelliah

[57] ABSTRACT

In a method of decontaminating a primary loop of a pressurized water reactor, including a steam generator, reactor coolant pump and hot and cold legs in the loop, the primary loop is isolated from a nuclear reactor vessel by closing hot leg and cold leg loop stop valves. Decontamination process water is circulated from one side of the steam generator channel head to the other side of the channel head via a bypass pipe extending between the cold leg and the hot leg without bypassing the water through steam generator tubes extending between the sides of the channel head. The level of the decontamination water in the steam generator is maintained at two to three feet in the tubes.

5 Claims, 2 Drawing Sheets

METHOD OF DECONTAMINATING A PWR PRIMARY LOOP

BACKGROUND OF THE INVENTION

The invention relates to a method of decontaminating a reactor coolant system of a pressurized water reactor (PWR) and, more particularly, to a method of decontaminating the primary loop of a reactor coolant system without decontaminating the reactor vessel.

Reactor coolant systems of pressurized water nuclear reactors form oxide corrosion films on the metal surfaces wetted by the coolant as the reactors operate and produce power. The coolant is essentially demineralized water containing parts per million additions of boron and lithium and small amounts of dissolved hydrogen. Commonly employed metals in reactor coolant systems include stainless steels and nickel base alloys and the corrosion films generally include iron, nickel and chromium-containing oxides. In the course of operation, corrosion particles (generally referred to as "crud") are eroded from the films by high velocity coolant and are transported to the cores of the reactor vessels where they become activated by the fuel assemblies contained therein. The activated crud subsequently released from the cores and transported by the high velocity coolant from the reactor vessels throughout the balance of the systems then redeposit in the corrosion films on the metallic surfaces of the primary loops associated with the reactor vessels. A "primary loop" of a reactor coolant system includes a steam generator, a reactor coolant pump and a hot leg and a cold leg interconnecting the reactor vessel with the steam generator.

Redeposited crud raises the background radiation levels of the plants to levels which drastically limits the permissible exposure time of personnel in the area around the reactor coolant systems during plant outages and other maintenance activities. Various chemical processes for reducing the background radiation levels by removing radioactive corrosion films and adjacent metal from the primary coolant metal surfaces have been proposed. See, e.g., M. E. Pick et al., "Chemical Decontamination Of Water Reactors—ECGB Developments And The International Scene", Nuclear Energy, Vol. 22, No. 6, 1983, pages 433–444, for a summary discussion of several permanganate, LOMI, CAN-DECON and other dilute chemical processes.

A considerable portion of the activated crud is redeposited in the steam generator channel heads and in the first two or three feet of the steam generator tubes extending above the channel heads. Relatively little crud deposits higher than about three feet in the steam generator tubes. In addition, much of the time spent by personnel in the course of plant outages is in the vicinity of the channel heads. Accordingly, the channel heads have been decontaminated in the preliminary steps of several outages. In one reported decontamination, the channel head was isolated from the reactor vessel, coolant pumps and interconnecting hot leg and cold leg piping by nozzle dams located in the channel head. Water diluted with small amounts of decontaminating chemicals then was circulated between the hot leg and the cold leg sides of the channel head and a decontamination treatment unit. See, in this regard, R. M. Orsulak et al., "Millstone II Decontamination", Water Chemistry Of Nuclear Reactor Systems 3, British Nuclear Energy Society, 1984. While the radiation levels of the channel heads have been reduced by such methods, the background radiation levels associated with the coolant pumps and the hot leg, cold leg and appurtenant piping have not been reduced.

It has been proposed to decontaminate entire reactor coolant systems using dilute chemical decontamination processes. See, e.g., U.S. Pat. No. 5,089,216 to Schlonski et al. which proposes to decontaminate entire systems using LOMI or CAN-DEREM dilute chemical processes. In practice, these processes will be applied in successive steps together with preliminary alkaline permanganate addition steps to first oxidize the chromium in the oxide films. However, there are cost and technical questions regarding entire system decontaminations. For example, the industry has questioned the advisability of decontaminating a reactor vessel (and perhaps the fuel assemblies in the core) in entire system decontaminations. Also, the industry has questioned the advisability of exposing the thin tubes in the steam generators to the corrosive decontamination chemicals employed in these dilute chemical decontamination processes.

SUMMARY OF THE INVENTION

It is an object of the present invention to effectively and economically decontaminate primary loops of pressurized water reactors. It is another object of the present invention to decontaminate one or more primary loops of a pressurized water reactor without decontaminating the reactor vessel itself and without wetting the steam generator tube inner surfaces, having little crud thereon, with water containing decontamination chemicals.

With these objects in view, the present invention resides in a method of decontaminating a primary loop of a pressurized water nuclear reactor, including a steam generator, a reactor coolant system pump and hot and cold leg piping, by isolating the primary loop from a reactor pressure vessel by closing hot leg and cold leg loop stop valves; and then circulating decontamination process water from one side of the channel head of the isolated steam generator to the other side of the channel head via bypass piping extending between the cold leg pipe and the hot leg pipe without bypassing the decontamination water through the steam generator tubes which extend between the hot leg and cold leg sides of the channel head. As employed herein, "decontamination process water" means water containing less than about five percent of decontamination reagents such as potassium permanganate, CAN-DEREM reagents and CAN-DECON reagents such as EDTA, citric acid and oxalic acid, LOMI reagents such as vanadous formate and picolinic acid which are added to the water to dissolve oxide films and loosen the crud which attaches to the oxide films. The decontamination process water may be the coolant water containing from about 10 ppm to about 2000 ppm or more boron which is employed during power operations to cool and moderate the fuel assemblies, or the coolant water from which the boron has been substantially removed (by, for example, ion exchangers of a chemical and volume control system), or other demineralized water containing essentially no boron, e.g., less than about 10 ppm boron. Preferably, the decontamination process water contains less than about 10 ppm boron, and more preferably less than about 1 ppm boron, because boron tends to buffer the decontamination reagents and require additional amounts of decontamination reagents. In a preferred practice, the fuel assemblies are permitted to remain in the core of the reactor vessel while decontaminating one or more of the primary loops. Most preferably, however, the fuel assemblies in the core are retained in coolant water containing from about 10 ppm to about 2000 ppm boron while one or more primary loops are decontaminated with water containing less than about 10 ppm boron. Advantageously, the decontamination may be accomplished more quickly if the fuel assemblies need not be removed from the core and if the decontamination process water is not buffered.

BRIEF DESCRIPTION OF THE DRAWINGS

The invention as set forth in the claims will become more apparent from the following detailed description of a preferred practice thereof shown, by way of example only, in the accompanying drawings, wherein:

DESCRIPTION OF THE PREFERRED PRACTICE

Figure 1:
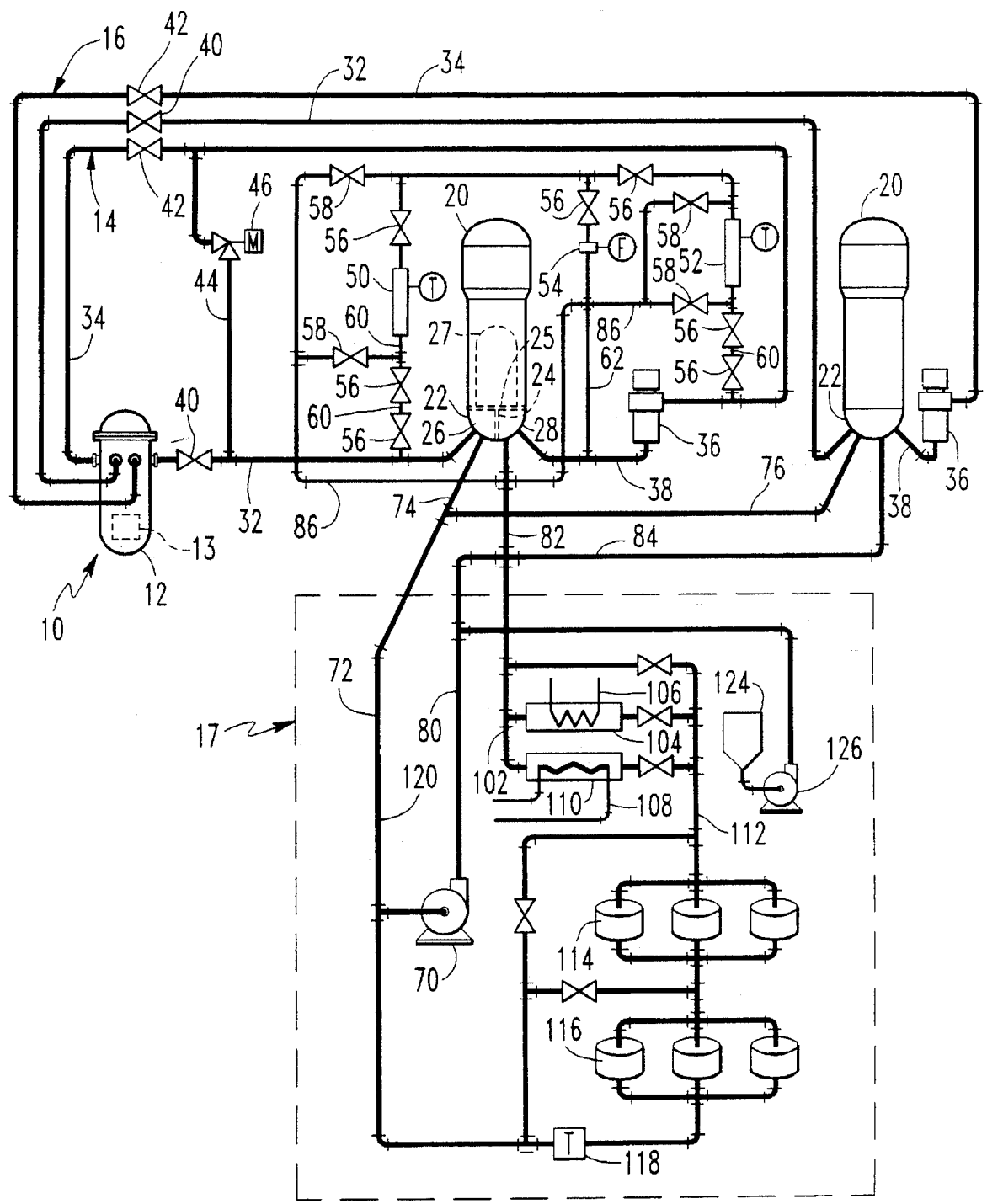
FIG. 1 is a schematic view of a nuclear reactor having two primary loops associated with one reactor vessel.

Referring now to the drawings in detail and in particular to FIG. 1 there is shown a nuclear steam supply system 10 of a commercial nuclear power plant for producing steam which is employed to drive turbines (not shown) for generating electric power, including a reactor vessel 12 with fuel assemblies 13 in the reactor core and two primary loops 14,16. Only primary loop 14 is shown in significant detail as the loops 14, 16 are substantially identical. The present invention also may be practiced with commercial nuclear power plants having from one to four loops associated with a reactor vessel. As shown in FIG. 1, the system 10 is in a shutdown mode and connected with a decontamination treatment unit 17. The unit 17 may be mounted on one or more skids. The treatment unit 17 circulates decontamination process water through one or both of the loops 14,16 to dissolve the corrosion films on the surfaces of the loops 14,16 together with about a mil or less of the base metal under the films.

Each primary loop 14,16 generally comprises a steam generator 20 having a channel head 22 with a divider plate 24 therein separating the channel head 22 into a hot leg side 26 and a cold leg side 28. The divider plate 24 extends from a tubesheet 25 which holds the ends of long U-tubes 27 extending between the hot leg side 26 and the cold leg side 28. The hot leg side 26 of the channel head 22 is interconnected with the reactor vessel 12 by a hot leg pipe 32 and the cold leg side 28 of the channel head 22 is interconnected with the reactor vessel 12 via one or more cold leg pipes 34. A reactor coolant system circulation pump 36 in the cold leg pipe 34 is connected with the channel head 22 by a large pump suction pipe 38, which provides the net positive suction head to the pump 36 during power operations (when the pump is circulating up to about 100,000 gpm or more of coolant water at pump heads of up to about 280 feet or more). The pump 36 is not operable during a decontamination process to circulate the decontamination process water because of its high heat input rate. In commercial nuclear power plants, the hot leg pipe 32 may have an internal diameter of up to about 29 inches or more, the cold leg pipe 34 may have a diameter of up to about 28 inches or more and the cold leg suction pipe 38 may have a diameter of up to about 31 inches or more.

Each primary loop 14, 16 of FIG. 1 has a hot leg isolation valve 40 and a cold leg isolation valve 42 which can be employed to isolate the primary loop 14,16 from the reactor vessel 12 in the practice of the present invention. In addition, a bypass line 44 having an inline motorized bypass valve 46 therein extends between the hot leg pipe 32 and the cold leg pipe 34 as is shown in FIG. 1. In commercial nuclear power plants, the bypass line may have an external diameter of up to about 8 inches or more. Also, each primary loop 14,16 includes instrumentation, including resistance thermal detectors 50,52 and a flow element 54 together with normal shutoff valves 56 and test valves 58, connected with the hot leg 32 and cold leg 34 via small diameter piping 60 and 62, respectively, all of which may act as traps for crud during power operations because of their small sizes and configurations.

Figure 2:
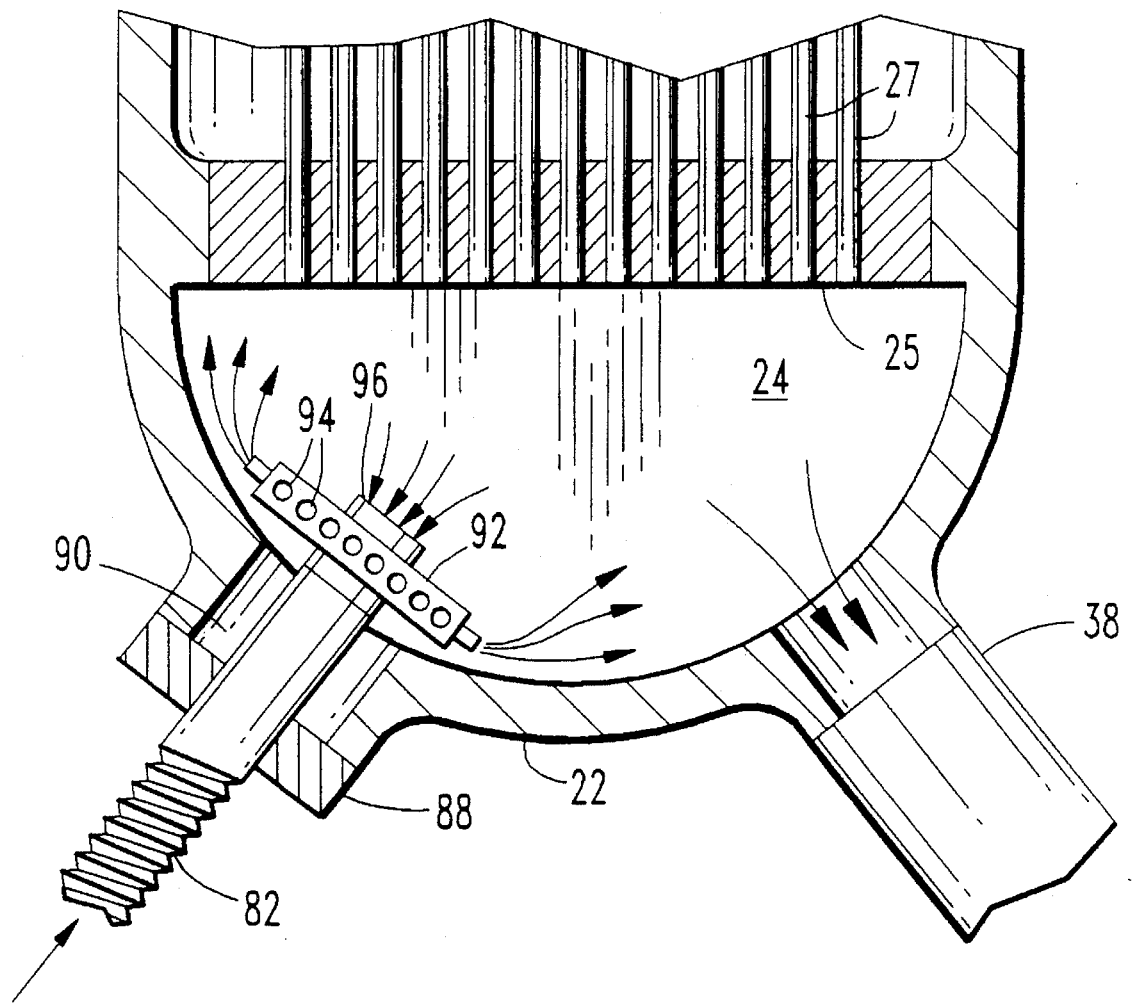
FIG. 2 is a elevational cross-sectional view of the cold leg side of a steam generator channel head of FIG. 1.

The treatment unit 17 is preferably a removable assembly including a circulation pump 70 having a suction pipe 72 with a suction branch pipe 74 extending from the hot leg side 26 of one channel head 22 and another suction branch pipe 76 extending from the hot leg side of the other channel head 22. A pump discharge pipe 80 branches to a pipe 82 extending to the cold leg side of one channel head 22 and to another pipe 84 extending to the cold leg side of another channel head 22. Also, branch pipes 86 may extend from the discharge pipe 82 for connection with normally flanged-off valves 58. As may be seen in FIG. 2, the branch pipe 82 extends to a modified cover plate 88 disposed over manway 90 of the cold leg side 26 of the channel head 22. A mixing device such as a jet mixer 92 may be employed to enhance the circulation of the decontamination process water in the channel head 22. The jet mixer 92 shown in FIG. 2 induces inward flow of decontamination water into the mixer 92 from within the channel head 22 through holes 94 and 96 and discharges the water into the channel head 22 through end nozzles 98.

The treatment unit 17 also has a recirculation discharge pipe 102 extending from the pump discharge pipe 80 for diverting a sidestream from the main flow in pipe 80 in order to purify the decontamination process water, which at one time or another in the course of a decontamination will contain crud particles, manganese dioxide and other solid particles or various ions such as chromic ions, ferric ions, manganous ions, permanganate ions, acetate ions, citrate ions and the like. Depending upon the thermal conditions of the particular decontamination step, the sidestream may flow through a heater 104 having an electrical heating element 106 for raising the temperature of the water, through a heat exchanger 108 cooled by water in pipe 110 or, alternatively, directly through pipe 112 to ion exchangers such as cation beds 114 and/or anion beds 116 to remove the various solid particles and ions. The sidestream may then flow through a trap 118 to collect any resin fragments and then through pipe 120 back to the pump suction pipe 72.

In a preferred practice of the present invention in connection with the nuclear steam supply system 10 as shown in FIG. 1, a primary loop 14 is isolated from a shutdown reactor vessel 12 with the fuel assemblies 13 in the core of the vessel and with coolant water containing up to about 2000 ppm boron or more in the reactor vessel 12. The stop valves 40,42 in the hot leg 32 and in the cold leg 32 are closed and the motorized bypass valve 46 in the bypass pipe 44 is opened. In addition, the stop valves 40,42 in the hot leg 32 and in the cold leg 34 of the other primary loop 16 may be open and the motorized bypass valve (not shown) maintained in a closed position for decontaminating only loop 14. The loops 14,16 may be decontaminated simultaneously or serially and/or the fuel assemblies 13 may be removed from the core of the reactor vessel 12.

In the preferred practice as shown in FIG. 1, demineralized water containing the decontamination chemicals employed in alkaline permanganate, LOMI, CAN-DEREM, CAN-DECON and similar processes may be pumped into the primary loop 14 from a chemical make-up tank 124 by a charging pump 126. Preferably, the decontamination process water contains less than 10 ppm boron because boron tends to buffer the decontamination reagents although the boron-containing coolant may be alternatively employed if it is not desired to remove the boron (and also lithium) or to replace the coolant water with other demineralized water. The decontamination water is then circulated by the pump 70 from the hot leg side 26 of the channel head 22 of the steam generator 20 and back to the cold leg side 28. A small portion of the water from the pump 70 is pumped through small diameter branch pipes 86 and the instrumentation 50,54 and then into the hot leg 32 or the cold leg 34 in order to assure that trapped crud is removed from the loop 14. A minor portion of the water from the pump 70 may be pumped through the ion beds 114,116 in order to remove the decontamination reagents and dissolved crud. The main flow of the decontamination water is injected into the cold leg side 28 of the channel head 22 through the jet mixer 92 shown in FIG. 2. The water then flows through the reactor coolant system pump 36, the cold leg pipe 34, the bypass pipe 44, the hot leg pipe 32 and then back to the hot leg side 26 of the channel head 22. The levels of the decontamination water on both sides of the channel head 22 is controlled at about two to three feet above the tubesheet 25 in order to remove most of the radioactivity from the tubes without exposing most of the inner tube surfaces to the decontamination chemicals.

The pump 70 may be sized to provide about 500 gpm of water to the primary loop 14 with a sidestream of up to about 100 gpm being diverted through the instrumentation 50, 52 and 54 while a sidestream of up to about 200 gpm is recycled through the ion beds 114,116. If the two primary loops 14,16 are to be decontaminated simultaneously, either two pumps 70 should be employed or the pump 70 should be sized to provide about 1200 gpm. Also, the size of the ion beds 114, 116 should be increased. Similarly, the entire unit 17 must be resized if three or four loops are to be simultaneously decontaminated.

While a present preferred embodiment of the present invention has been shown and described, it is to be understood that the invention may be otherwise variously embodied within the scope of the following claims of invention.

We claim:

1. A method of decontaminating a PWR primary loop, comprising the steps of:

isolating a primary loop from a nuclear reactor vessel by closing hot leg and cold leg loop stop valves, the primary loop having a steam generator with a channel head, the channel head having a cold leg side connected with a cold leg and a hot leg side connected with a hot leg; and then circulating decontamination process water from one side of the channel head to the other side of the channel head via a bypass pipe extending between the cold leg and the hot leg without bypassing the water through steam generator tubes extending between the sides of the channel head.

2. The method of claim 1, wherein at least two primary loops are isolated from the nuclear reactor while the decontamination process water is simultaneously circulated through the primary loops.

3. The method of claim 1, wherein fuel assemblies are retained in the reactor vessel while at least one primary loop is decontaminated.

4. The method of claim 3, wherein the primary loop is decontaminated with water containing less than 10 ppm boron while the fuel assemblies are retained in water containing more than 10 ppm boron.

5. The method of claim 1, wherein the level of the decontamination process water in the steam generator is maintained at from about two to about three feet in the steam generator tubes.

\* \* \* \* \*